June 26, 1945.   E. WURGER   2,379,129
REVOLUBLE DIAPHRAGM FOR FILM-DISPLAYING APPARATUS
Filed June 2, 1943
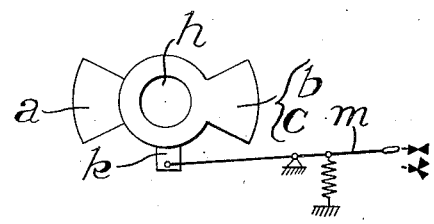
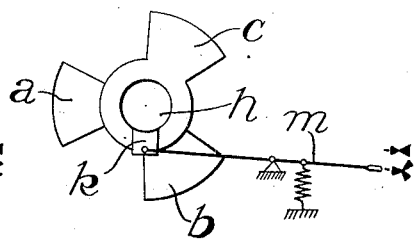
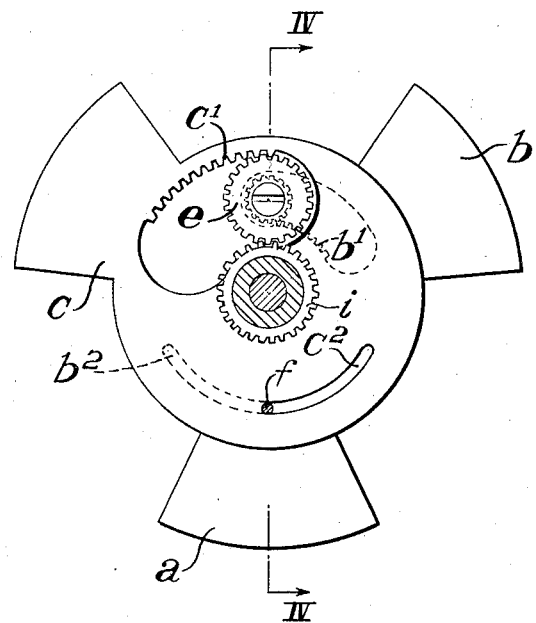
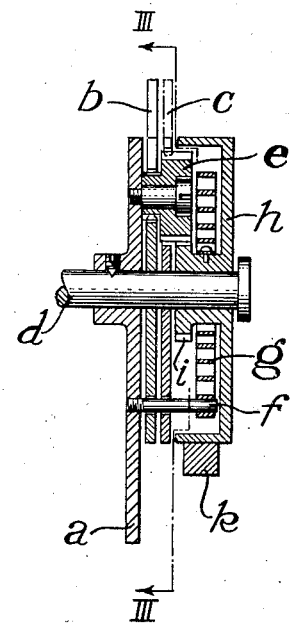
Inventor:
EMILE WURGER
By E. F. Wendroth
Attorney Patented June 26, 1945

2,379,129

UNITED STATES PATENT OFFICE 2,379,129

REVOLUBLE DIAPHRAGM FOR FILM-DISPLAYING APPARATUS

Emile Wurger, Le Locle, Switzerland

Application June 2, 1943, Serial No. 489,414
In Germany June 20, 1942

6 Claims. (Cl. 88—19.3)

Known revoluble diaphragms for film-displaying or projector apparatus comprising means for selecting the shutting off frequency to suit operational conditions generally include a shutter blade adjustably mounted on a driving shaft and adapted to be revolved with respect to a second shutter blade fixedly mounted on the same shaft and to be securely held in its new position, thereby permitting either of two shutting off frequencies to be used depending upon whether both blades overlap or are offset to each other as is necessary for example for displaying silent films and talking films in one and the same camera. Now apart from the fact that the ratio of 1:2 between the two shutting off frequencies is unfavourable from the point of view of light technique since silent films are generally run through the camera gate at the rate of 16 images per second while talking films are usually run through said gate at the rate of 24 images per second, the film-displaying apparatus must be brought to a standstill when this known type of diaphragm is used in order to perform mutual adjustment of the shutter blades. Besides the foregoing disadvantage, a further disadvantage is involved in this, the more so as much manipulated has to be effected single-handed.

An object of the present invention is to provide a new revoluble diaphragm for film-displaying or projector apparatus having such an improved construction as to obviate the foregoing disadvantages while permitting either two shutting off actions or three shutting off actions per revolution of the diaphragm to be obtained selectively so as to match film-projecting conditions and the type of film being projected.

Another object of the invention is to provide an improved revoluble diaphragm as aforesaid, wherein the change over from the former shutting off condition of the diaphragm to the latter condition can be performed very easily by the operator without stopping the camera, this only requiring manipulation of an actuator such as a lever whereby owing to a braking action a pair of hitherto overlapping shutter blades can be automatically fanned out to such symmetrical positions relatively to a third blade as to then give the diaphragm a three-bladed operative structure, this actuation being reversible.

A further object of the invention is to provide an improved revoluble diaphragm as aforesaid embodying a control device including spring or like flexible retainer and abutment means capable of keeping the diaphragm blades in the selected positions, thereby precluding any undue change over from one of said positions to the other while the camera is functioning.

With these and such other objects in view as will incidentally appear hereafter, the invention comprises the novel construction and combination of parts that will now be described in detail with reference to the accompanying diagrammatic drawing exemplifying the same and forming a part of the present disclosure.

In the drawing:

Figures 1 and 2 are diagrammatic illustrations of a revoluble diaphragm shown in two different operative conditions.

Figure 3 is a cross section of the diaphragm on the line III—III of Fig. 4.

Figure 4 is an axial section of the diaphragm on the line IV—IV of Fig. 3.

The revoluble diaphragm shown in Figures 1 to 4 comprises three shutter blades $a$, $b$, $c$ having a disk-shaped central part. The blade $a$ is fixedly mounted on a driving shaft $d$ by means of a grub screw while the blades $b$, $c$ are loosely mounted on the said shaft. The blade $a$ carries on its disk-shaped central part a toothed wheel $e$ having a stepped outline, the portion of larger diameter of this wheel meshing with an inward toothed sector $c^1$ provided in the disk-shaped central part of the shutter blade $c$ while its portion of smaller diameter meshes with an outward toothed sector $b^1$ provided on the disk-shaped central part of the shutter blade $b$. The disk-shaped central part of the blade $a$ rigidly carries an abutment pin $f$ projecting at right angle therefrom and freely engaged through coextensive arcuate slots $b^2$, $c^2$ formed in the disk-shaped central portions of the blades $b$, $c$. The foremost end of the pin $f$ has attached thereto the outer end of a spiral spring $g$ the inner end of which is securely fixed to the hub portion of a brake drum $h$ loosely mounted on the driving shaft $d$. The hub portion of this brake drum is formed at its inner flanged end as a toothed wheel $i$ which meshes with the portion of larger diameter of the toothed wheel $e$. The toothed members $i$, $e$, $c^1$, $b^1$ make up a compact gear which is set into action when the brake drum $h$ is engaged by a brake shoe $k$ responsive to a pivotal movement of an actuator such as a spring-urged lever $m$.

The operation of the above-described revoluble diaphragm is as follows:

Normally both loosely mounted blades $b$, $c$ are held in overlapping relation by the influence of the spiral spring $g$ in a position symmetrical to the fixed blade $a$. Therefore, the revoluble diaphragm produces two shutting off actions for each revolution. Should now the brake shoe $k$ be applied against the drum $h$ by means of the brake lever $m$ (as shown in Figures 1 and 2) a relative angular motion takes place between the drum $h$ and the fixed blade $a$. Owing to the gear which is interposed between these two parts, this angular motion causes the loose blades $b$, $c$ to fan out from each other with respect to the blade $a$ until they have reached their end positions as predetermined by the cooperation of the abutment pin $f$ and associated stroke-limiting arcuate slots $b^2$, $c^2$ and the three blades are then equidistantly spaced in a circle so that with such a diaphragm three shutting off actions are produced for each revolution.

The revoluble diaphragm might also be so built as to cause its three blades to be held by the action of the spiral spring $g$ in the position shown in Fig. 2 and to be brought by applying the brake drum $h$ into the position shown in Fig. 1. This constructional modification is obvious and does not require special illustration.

What I claim is:

1. A revoluble diaphragm for film-displaying apparatus, comprising a shutter blade fixed to its driving shaft, a pair of overlapping shutter blades loose upon the shaft, braking means loose on said shaft and having a yielding retainer connection with the fixed blade, a gear interposed between each loose blade and the fixed blade and between the latter and the braking means, and an actuator for said means.

2. A revoluble diaphragm for film-displaying apparatus, comprising a shutter blade fixed to its driving shaft, a pair of overlapping shutter blades loose upon the shaft, the three blades being offset along the shaft, braking means loose on said shaft, a resilient connection between said means and an abutment projection on the fixed blade, slots in the loose blades for engagement of said projection, a gear interposed between each loose blade and the fixed blade and between the fixed blade and the braking means, and an actuator for said means.

3. A revoluble diaphragm for film-displaying apparatus, comprising a shutter blade fixed to its driving shaft, a pair of overlapping shutter blades loose upon the shaft, the three blades being equally sized and offset along the shaft, braking means loose on said shaft, an abutment pin rigid on said fixed blade, a pair of stroke-limiting arcuate slots in the loose blades through which the pin engages, a spring connection between the braking means and pin, a gear interposed between each loose blade and the fixed blade and between the braking means and fixed blade, and an actuator for said means.

4. A revoluble diaphragm for film-displaying apparatus, comprising a shutter blade fixed to its driving shaft, a pair of overlapping shutter blades loose upon the shaft, the three blades being offset along the shaft, a brake drum loose on said shaft, an abutment pin rigid on said fixed blade, a spiral spring interconnecting the brake drum and pin, a gear housed in said drum and providing intermesh between each loose blade and the fixed blade and between the brake drum and fixed blade, an actuator including a brake shoe for said drum, and a pair of arcuate slots in the loose blades for engagement of the pin, said slots limiting the fanning out stroke of the loose blades upon application of the brake shoe against the drum by the actuator.

5. A revoluble diaphragm for film-displaying apparatus, comprising a shutter blade fixed to its driving shaft, a pair of overlapping shutter blades loose upon the shaft, the three blades being offset along the shaft, a brake drum loose on said shaft, an abutment pin rigidly projecting at right angle from said fixed blade, a spiral spring interconnecting the brake drum and pin, a gear housed in said drum, said gear including a stepped toothed wheel rigid with the fixed blade as well as cooperative teeth on the loose blades and teeth on the drum, an actuator including a lever and a brake shoe engageable with said drum, and a pair of coextensive arcuate slots in the loose blades, said slots being engaged by the pin and limiting the angular stroke of the loose blades when they fan out responsive to application of the brake shoe against the drum by the actuator.

6. A revoluble diaphragm for film-displaying apparatus, comprising a shutter blade fixed by its disk-shaped central part to its driving shaft, a pair of overlapping shutter blades loosely mounted by their disk-shaped central parts on the shaft, the three blades having their central parts offset along the shaft, a brake drum having a hub loosely girdling the shaft, an abutment pin rigidly projecting from the fixed blade, a spiral spring interconnecting the pin and the drum hub, a gear housed in said drum, said gear including a toothed wheel having a stepped outline defining two annular sets of teeth of different diameters and also including cooperative inward and outward toothed sectors on the respective loose blades as well as teeth on the drum hub, an actuator including a spring-urged lever and a brake shoe pivoted to said lever and engageable with said drum, and a pair of coextensive arcuate slots in the loose blade central parts, said slots being so freely engaged by the pin as to limit the angular stroke of the loose blades when these fan out responsive to application of the brake shoe against the drum due to the lever impulse.

EMILE WURGER.